United States Patent
Homer et al.

(10) Patent No.: US 6,588,333 B1
(45) Date of Patent: Jul. 8, 2003

(54) METHOD FOR PRODUCING AN OPTICAL SCALE

(75) Inventors: Michael Homer, Dursley (GB); James R Henshaw, Stroud (GB); Peter G Holden, Cirencester (GB)

(73) Assignee: Renishaw PLC, Gloucestershire (GB)

( * ) Notice: Subject to any disclaimer, the term of this patent is extended or adjusted under 35 U.S.C. 154(b) by 118 days.

(21) Appl. No.: 09/857,710
(22) PCT Filed: Oct. 13, 2000
(86) PCT No.: PCT/GB00/03928
§ 371 (c)(1), (2), (4) Date: Jun. 8, 2001
(87) PCT Pub. No.: WO01/29516
PCT Pub. Date: Apr. 26, 2001

(30) Foreign Application Priority Data

Oct. 15, 1999 (GB) .............................................. 9924332

(51) Int. Cl.$^7$ .............................. B44C 1/24; B41F 19/02
(52) U.S. Cl. ................................ 101/32; 101/23; 101/6; 356/498
(58) Field of Search .............................. 101/4, 5, 6, 22, 101/23, 32; 33/707; 250/237 G; 356/499, 496, 498; 359/569

(56) References Cited

U.S. PATENT DOCUMENTS

| | | | |
|---|---|---|---|
| 1,050,879 A | * 1/1913 | Wadsworth | ................... 72/188 |
| 4,682,540 A | 7/1987 | Eastman et al. | ............... 101/32 |
| 4,926,566 A | 5/1990 | McMurtry et al. | ............ 33/771 |
| 4,959,542 A | * 9/1990 | Stephens | ................ 250/237 G |
| 4,974,962 A | 12/1990 | Stephens et al. | ............ 356/356 |
| 5,033,817 A | * 7/1991 | Stephens | .................... 359/569 |
| 5,088,209 A | 2/1992 | Lummes et al. | ............... 33/707 |
| 5,302,820 A | 4/1994 | Henshaw et al. | ...... 250/231.16 |

FOREIGN PATENT DOCUMENTS

| | | |
|---|---|---|
| EP | 0 207 121 B1 | 1/1987 |
| WO | WO 94/25830 | 11/1994 |

* cited by examiner

Primary Examiner—Leslie J. Evanisko
(74) Attorney, Agent, or Firm—Oliff & Berridge, PLC.

(57) ABSTRACT

A length of scale (1) which has a profile consisting of a sequence of troughs (18) and crests (16) is subjected to a process to make the shapes of the crests more regular, thus increasing and making more predictable the signal reflected from the crests on the scale. The process comprises passing a length of scale (1) between upper (20) and lower (22) cylindrical rollers. The lower roller (22) may be driven or the length of scale (1) may be pulled through. Reference marks or identification marks may be added to the scale by appropriately marking the upper roller (20). Alternatively, the marks may be added at an initial embossing step which imparts the troughs and crests profile to the scale or at a separate subsequent step.

19 Claims, 2 Drawing Sheets

METHOD FOR PRODUCING AN OPTICAL SCALE

BACKGROUND OF THE INVENTION

1. Field of Invention

The present invention relates to producing a scale for use in opto-electronic scale reading apparatus.

2. Description of Related Art

A known form of opto-electronic scale reading apparatus for measuring relative displacement of two members comprises a scale on one of the members, having scale marks defining a periodic pattern, a read head provided on the other member, means for illuminating the scale, periodic diffraction means for interacting with light from the scale marks to produce interference fringes having movement relative to the read head and detecting means in the read head responsive to the fringes to produce a measure of the displacement.

An example of such apparatus is disclosed in EP-A-0 207 121 and also U.S. Pat. No. 4,974,962, each of which shows the means for illuminating and the periodic diffraction means in the read head. U.S. Pat. No. 4,926,566 discloses a method of producing a scale, in the form of a flexible tape produced by rolling, the pitch of the scale marks being 20 $\mu$m or 40 $\mu$m for example. The illuminating means, the diffraction means and the detecting means responsive to the fringes may be integrated in the read head in the manner described in U.S. Pat. No. 5,302,820. Such a scale may have reference marks along its length, as disclosed in WO94/25830 in which a depression is provided on the scale by stamping the scale at appropriate intervals with a cylindrical roller.

In the production of a length of scale, for example as described in U.S. Pat. No. 4,926,566, although flanks of the embossed profile of the scale are well defined, the crests can be somewhat irregular. Although this is not a problem in scale reading apparatus in which the scale is lit from an end, since the crests are not read, this could be a problem in apparatus in which the scale is lit from one side, in which the crests are read.

SUMMARY OF THE INVENTION

According to a first aspect of the present invention, there is provided a method of producing a length of scale for use in opto-electronic scale reading apparatus, comprising subjecting a length of scale to an embossing process to form a profile which is a sequence of troughs and crests, wherein after the embossing process the length of scale is subjected to a further process which acts on the crests to make more regular their shapes.

The further process could comprise passing the embossed length of scale between first and second rollers to render the crests more regular as regards their shapes. In this case, one of the rollers could be a driven roller to pass the length of scale between the rollers. Alternatively, the length of scale could be pulled through the rollers. Each of the rollers could be a plain roller.

In a second aspect of the invention, there is provided a method of providing reference marks or identification marks on the scale during the embossing process or the process which acts on the scale to make their shapes more regular.

The reference marks or identification marks may be imprinted on the scale in either process by providing the relevant roller with suitable marks.

BRIEF DESCRIPTION OF THE DRAWINGS

The present invention will now be described, by way of example, with reference to the accompanying drawings wherein.

DETAILED DESCRIPTION OF THE PREFERRED EMBODIMENTS

Figure 1:
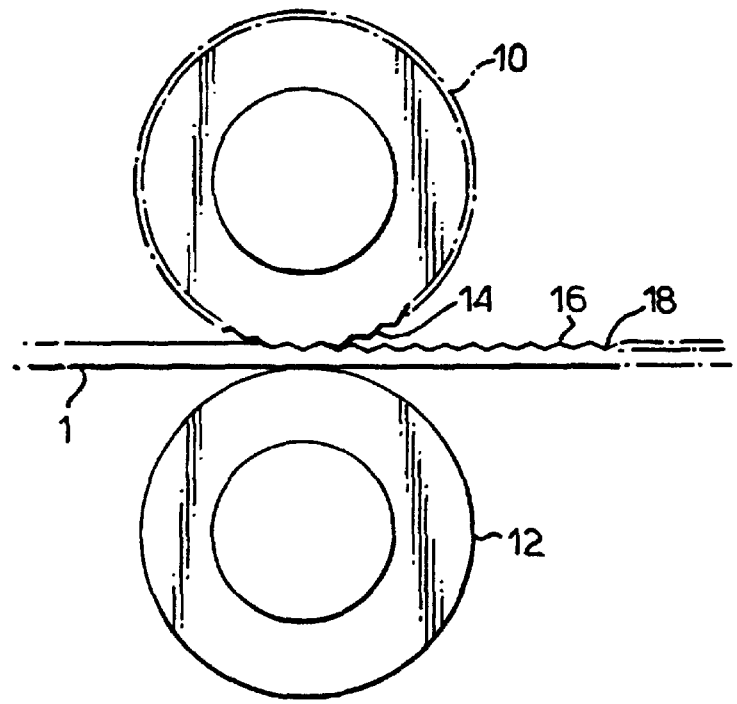
FIG. 1 is a diagrammatic illustration of an embossing process on a length of scale.

First, a length of scale 1 for use in opto-electronic scale reading apparatus is produced, for example, by a method as described in U.S. Pat. No. 4,926,566, in which the scale is passed between upper and lower rollers 10,12 as shown in FIG. 1, in which the upper roller 10 has a profile 14 which is the counterpart of the desired scale profile. The lower roller 12 may be plain, or it may also have a profile, as described in U.S. Pat. No. 5,088,209. This embossing process results in a scale profile which is a sequence of troughs 18 and crests 16. Typically, the scale could be of spring steel over which is provided a layer of copper. This may be plated with nickel and/or gold, as described in U.S. Pat. No. 4,926,566. The sequence of troughs and crests provide marks which can be read optically in such apparatus.

Figure 2:
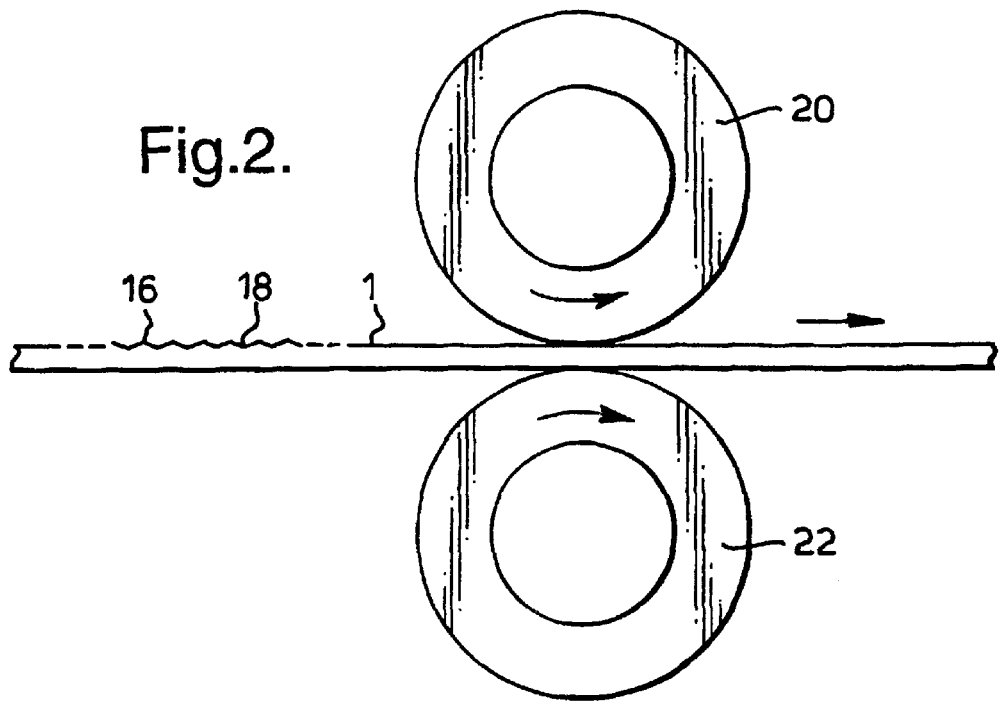
FIG. 2 is a diagrammatic illustration of two rollers acting on a length of scale.

Next as shown in FIG. 2, the embossed length of scale 1 is passed between an upper cylindrical roller 20 and a lower, backing cylindrical roller 22, the latter, for example, being a driven roller. By way of example, roller 20 could be made up of a steel core with a smooth electroless nickel coating. Instead of being passed between the rollers 20 and 22 by the driving of roller 22, the length of scale 1 could be pulled through the rollers.

Figure 5:
FIG. 5 shows the profile of a finished scale.

The effect of the above process is to make more regular the shapes of the crests of the profile of the length of scale 1 as regards their shapes, increasing and making more predictable the signal achieved by reflection from the crests in use of the length of scale and substantially eliminating plating imperfections and disturbances from the earlier embossing process. For example, the crests 16 may be flattened as shown at 30 in FIG. 5. Such flattened crests give improved light reflection, even when lit from the side.

Typically, the upper cylindrical roller 20 is a plain roller. The lower cylindrical roller 22 is either a plain roller or a profiled roller, as with the roller 12. The operation could instead be done with a suitably marked top roller which leaves appropriate marks on the scale crests. These might simply be a part number or other identification, but equally could be used to perform some function, like providing reference marking, providing for absolute position encoding or providing for automatic read head configuration.

It should be noted that this further process should have no substantial permanent effect on the pitch of the scale so as not to disturb the scale accuracy.

Figure 3:
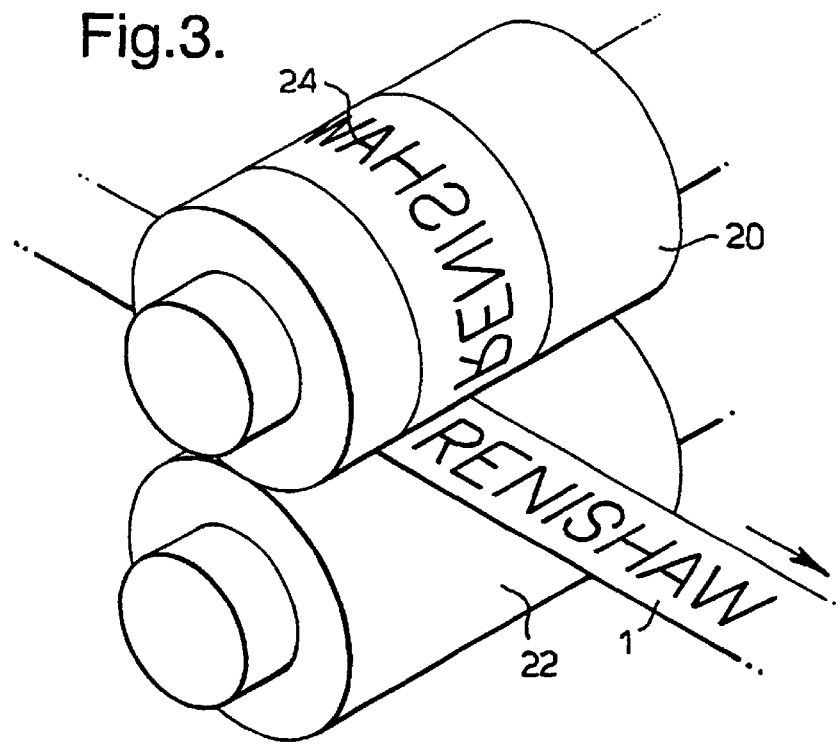
FIG. 3 shows the rollers of FIG. 2 with laser etching on the upper roller.

The marks may be applied to the crests of the scale by laser etching the desired marks 24 in reverse on the upper roller as in FIG. 3. On passing the embossed scale through the rollers, the mark is imprinted onto the scale crests, each revolution of the roller producing a repeat of the mark on the scale. This method is particularly suitable for adding identification numbers etc on the scale.

Figure 4:
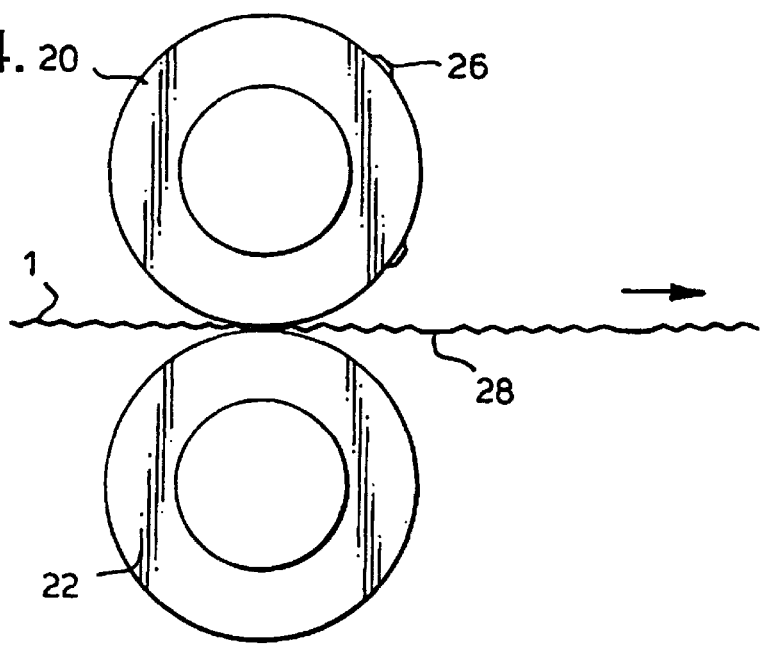
FIG. 4 shows the rollers of FIG. 2 with embossing means on the upper roller.

Reference marks may also be added to the scale by incorporating an embossing device with the upper roller, such as a flat-ended chisel 26 as shown in FIG. 4. As the chisel hits the scale it flattens some of the crests and creates a reflective feature 28 on the scale, such as a bright plane mirror.

Another method of producing marks on the scale is by chemical etching. For example using a spring steel scale coated with first copper and then gold, some of the gold outer layer is removed mechanically to expose the copper underneath. The exposed copper is chemically treated to blacken it, for example using sodium sulphate. A 200 $\mu$m-wide dark line produced by this method in a 40 $\mu$m period incremental scale results in that the incremental signal only suffers a 20% drop in size as it passes the reference mark. This is a result of the filtering effect of the readhead, as described in EP 207121.

The marks could be added to the scale in a similar manner at other steps of the scale-making process, such as a subsequent step or the initial embossing step. Adding the reference marks in the subsequent step has the advantage that a stamping device other than a roller may be used allowing the reference marks to be added in an irregular pattern. A scale which has been marked in the initial embossing step may be passed through the plain rollers with very little effect on the scale.

Where the mark is an identification number, it may be imprinted on the fill width of the scale or alternatively just on a fraction of the width of the scale (i.e. along one edge).

Reference marks on the scale may be single, periodic or in specific sequences. A pseudorandom pattern of dark or bright lines of different widths can be formed in the longitudinal direction of the scale to make an autocorrelator reference mark that can be detected with a matching detector pattern. A series of bright and dark lines in the scale can be arranged to form a zone plate that will act as a lens and can be used to image a reference pattern onto a matching detector. A pattern of marks can also be provided (by the above methods) which encodes information about the absolute position along the scale.

Any of the above methods of marking the scale may be used independently, even without the further process for making the crests 16 more regular.

What is claimed is:

1. A method for producing a scale for an opto-electronic scale reading apparatus comprising:
    subjecting a length of scale (1) to an embossing process to form a profile which is a sequence of troughs (18) and crests (16);
    characterised in that after the embossing process, the length of scale is subjected to a further process which acts on the crests to make their shapes more regular.

2. A method for producing a scale according to claim 1, wherein said further process comprises passing the length of scale between an upper cylindrical roller and a lower backing cylindrical roller.

3. A method for producing a scale according to claim 2, wherein the lower backing cylindrical roller (22) is a driven roller.

4. A method for producing a scale according to claim 2, wherein the length of scale (1) is pulled through the rollers (20,22).

5. A method for producing a scale according to claim 2, wherein the upper roller (20) is made of a steel core with a smooth electroless coating.

6. A method for producing a scale according to claim 2, wherein the upper roller (20) is suitably marked to leave appropriate marks on the scale.

7. A method of producing a scale according to claim 6, wherein the upper roller (20) is marked by laser etching.

8. A method of producing a scale according to claim 6, wherein the upper roller (20) is suitably marked to selectively remove an outer layer of the scale and the scale is chemically treated to blacken the marks in the scale.

9. A method for producing a scale according to claim 6, wherein the upper roller (2) is marked with embossing means.

10. A method for producing a scale according to claim 9, wherein the embossing means comprise at least one flat-ended chisel (26).

11. A method for producing a scale according to claim 1, wherein marks are added to the scale during the embossing process, the embossing process comprising passing the scale through upper (10) and lower (12) rollers and the upper roller (10) being suitably marked to produce said marks.

12. A method for producing a scale according to claim 11, wherein the upper roller (10) is marked by laser etching.

13. A method for producing a scale according to claim 11, wherein the upper roller (10) is marked with further embossing means.

14. A method for producing a scale according to claim 13, wherein the further embossing means comprises at least one flat-ended chisel.

15. A method for producing a scale according to claim 11, wherein the upper roller is suitably marked to selectively remove an outer layer of the scale and the scale is then chemically treated to blacken the mark produced on the scale.

16. A method for producing a scale according to claim 1, wherein marks are added to the scale in a subsequent step, following the further process which acts on the scale to make their crests more regular.

17. A method for producing a scale according to claim 16, wherein the subsequent step comprises mechanically selectively removing an outer layer of the scale and then chemically treating the scale to blacken the marks produced on the scale.

18. A method for producing a scale according to claim 16, wherein the subsequent step comprises using further embossing means to emboss a mark in the scale.

19. A method for producing a scale according to claim 18, wherein the further embossing means comprises a flat-ended chisel.

* * * * *